June 27, 1967 E. RAINER 3,328,689
A.C. AMPLIFIED HALL GENERATOR WATTMETER
Filed Oct. 31, 1963 2 Sheets-Sheet 1

June 27, 1967  E. RAINER  3,328,689
A.C. AMPLIFIED HALL GENERATOR WATTMETER
Filed Oct. 31, 1963  2 Sheets-Sheet 2

_United States Patent Office_ 3,328,689
Patented June 27, 1967

3,328,689
A.C. AMPLIFIED HALL GENERATOR WATTMETER
Erich Rainer, Nurnberg, Germany, assignor to Siemens-Schuckertwerke Aktiengesellschaft, Erlangen, Germany, a corporation of Germany
Filed Oct. 31, 1963, Ser. No. 320,332
Claims priority, application Germany, Oct. 31, 1962, S 82,277
2 Claims. (Cl. 324—117)

My invention relates to alternating current (A.C.) power meters and particularly to such meters measuring active power and employing Hall generators having one input responding to the voltage component of the power to be measured and another input responding to the current component.

Such Hall generators comprise a flat semiconductor wafer having along two opposite edges respective input terminals for connection to a current source, two Hall-voltage output electrodes on the other two edges at points midway between the terminals, and a field coil for producing magnetic field lines transverse to the wafer plane in response to a second input. One input current between the terminals produces equipotential lines across the water parallel to the terminals. When the field coil is not energized, the same equipotential line crosses both Hall electrodes. However, when magnetic field lines, produced by the other input through the field coil, pass transversely through the wafer they distort the equipotential lines and a Hall-voltage output obtains across the Hall electrodes proportional to the product of the inputs to the terminals and the field coil.

Thus it is known that an A.C. load power can be measured without contacts by connecting one input of a Hall generator to respond to load current and the other to respond to load voltage, namely in wattmeter connection, thereby obtaining a waveform corresponding to the instantaneous powers, integrating the result over a unit time so as to determine the average or D.C. Hall-voltage component which corresponds to average power, and then reading the result on a meter.

In this method the D.C. component, i.e. the average value, of the Hall voltage is proportional to the power to be measured. This D.C. Hall-voltage component value is quite small particularly at low powers and must be amplified accurately. However pure D.C. amplifiers, because of their inevitable zero-point drift, are incapable of amplifying these small values with the exacting accuracy required, and may even suppress the D.C. values altogether, thereby producing false results.

It is an object of my invention to provide an improved electronic A.C. power meter, and a more particular object to provide one which avoids the above difficulties.

More specifically it is an object of my invention to provide an electronic A.C. meter of the Hall-generator-integrator type wherein the necessary amplification may be applied to a purely A.C. voltage, so that the above difficulties disappear.

To these ends and according to a feature of my invention, in an A.C. meter having a Hall-voltage generator and an integrator, I rectify one of the inputs to the Hall generator, thereby operating the Hall generator as a modulator, and after amplifying the resulting modulated and alternating Hall voltage, I apply it to the integrator through a demodulator.

Rectifying one of the input values of a power meter having a Hall generator is known for measuring reactive power. However the present invention is concerned with measuring active power values.

According to another, preferred, feature of my invention, I connect the field circuit of the Hall generator to the line voltage through a rectifier bridge and a high resistance, and I connect the control current circuit of the Hall generator in series with the load. Preferably I control the demodulator with a square-wave generator excited by the line voltage.

These and other features of the invention are pointed out in the claims. Other objects and advantages of the invention will become obivous from the following detailed description when read in light of the accompanying drawings wherein:

FIG. 1 consists of three coordinate diagrams (a), (b) and (c) each having curves varying with respect to time and showing the basic operation of the invention;

The present invention functions to amplify the output voltage of a Hall multiplier with the quality of a measuring amplifier to supply the amplifier amplitude to an integrating or reactive component; the Hall output voltage being proportional to the product of two sinusoidal A.C. magnitudes of the same frequency.

In order to function as an electrical power or wattmeter of A.C. voltage, a Hall multiplier must produce a voltage proportional to the power. The unidirectional component of the voltage at the Hall electrodes is proportional to the active power of the load. Consequently, the unidirectional component must not be distorted in the amplification of the Hall voltage. When the power consumption of the load is small, the amplitude of the Hall voltage is correspondingly small. The Hall voltage may not therefore be amplified by a D.C. voltage amplifier of the usual type, since such an amplifier has an inevitable zero point drift. A modulation amplifier must thus be utilized.

In accordance with the present invention, the Hall multiplier itself is utilized as a modulator for such amplifying operation. The Hall voltage, comprising an A.C. voltage component of doubled frequency and a D.C. voltage component proportional to the active power consumption of the load, is modulated by the rectifier 5 in FIG. 2.

The rectification of the field current $i_F$ of the Hall multiplier results in the production of the product $$|\hat{U} \sin \omega t| \cdot \hat{I} \sin (\omega t + \phi)$$

instead of the product $$\hat{U} \sin \omega t \cdot \hat{I} \sin (\omega t + \phi)$$

The product $$|\hat{U} \sin \omega t| \cdot \hat{I} \sin (\omega t + \phi)$$

is the output voltage and is a pure A.C. voltage which may be amplified to any desired extent by an A.C. voltage amplifier which has no zero point error. The A.C. voltage amplifier thus utilized operates as a regulating amplifier. The Hall A.C. voltage at the input of the amplifier functions as the control magnitude.

Figure 1:
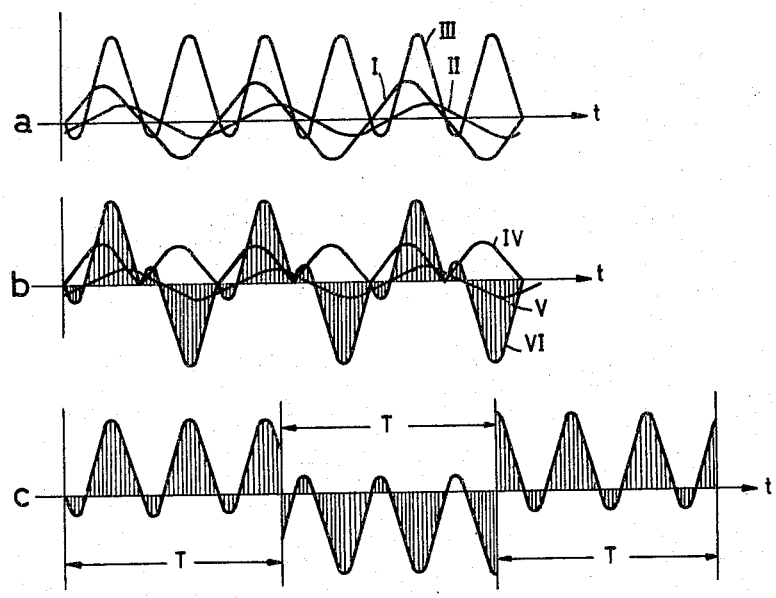

In FIG. 1 the diagram (a) illustrates the problem posed in measuring real A.C. power with a device such as a Hall generator. Curve I represents the voltage component which constitutes one input to a Hall-generator wattmeter in the prior art. Thus for curve (I) $\qquad v=\hat{V} \sin \omega t$ Curve II shows load current component to be measured. Thus for curve (II) $\quad i = \hat{I} \sin(\omega t + \phi)$ Curve III represents the product, constituting the Hall voltage. Thus in curve (III) $\quad vi = \hat{V}\hat{I} (\sin \omega t) \sin(\omega t + \phi)$ The average or D.C. component of curve III represents the real or active power. When the curve III is produced by a Hall generator the D.C. component is quite small, and must be amplified particularly at small input values. However, the D.C. component is subject to accurate amplification only with great difficulty.

An apparatus according to the invention rectifies one of the two Hall-generator inputs so that only its absolute value is operative. Thus in FIG. 1, diagram (b), a current curve V corresponds to curve II. However, the negative half-waves of a voltage curve IV corresponding to curve I are rectified, so that the energizing current $i_F$ of the Hall-generator field is $$i_F \sim \hat{V} |\sin \omega t|$$

A curve VI representing the product of curves IV and V is a pure alternating voltage defined as $$V_H \sim \hat{V}\hat{I} |\sin \omega t| \sin(\omega t + \phi)$$

A suitable A.C. amplifier can then amplify this modulated alternating voltage and pass it to a demodulator which causes the input to a following integrator to correspond to curve III. If the integrating device is composed of a counting reactor it is necessary periodically to reverse its magnetizing direction. The curve (c) in FIG. 1 illustrates the amplified demodulated voltage which is reversed according to the meter timing after each time period T.

Figure 2:
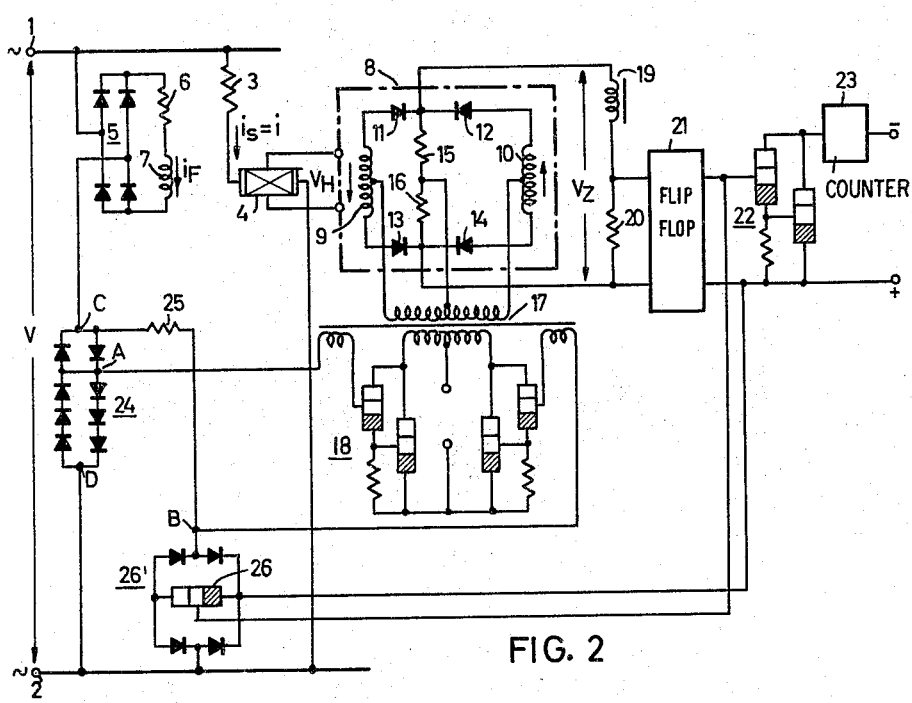
FIG. 2 is a schematic diagram of a circuit embodying features of the invention.

FIG. 2 is a schematic diagram of the construction of an alternating current meter according to the invention. Two current leads 1 and 2 supply the voltage V across any desired load 3 which is connected in series with the control current of a Hall generator 4. Also connected across the line voltage is a rectifier bridge 5 energizing the field winding 7 of the Hall generator 4 through a high resistance 6. The high resistance assures that the zero-passage points of the field current $i_F$ coincide with the zero-passage points of the alternating voltage. Reference character $i$ identifies the load current which is identical with the Hall-generator control current $i_s$.

Figure 5:
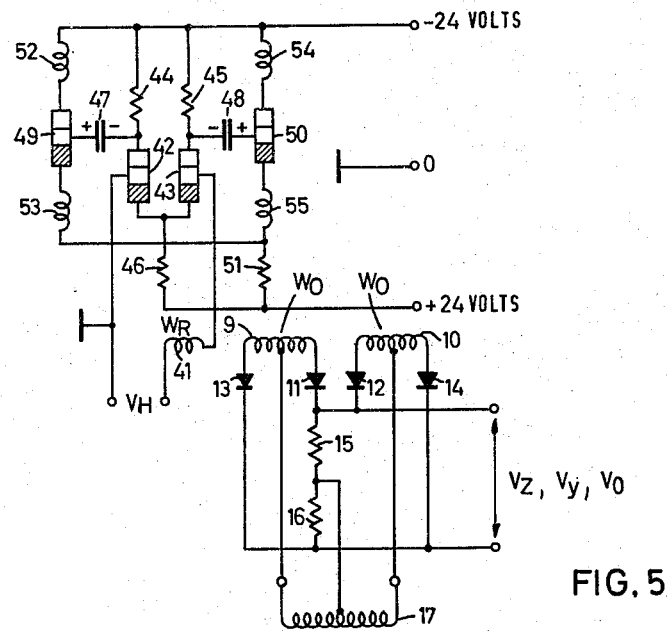
FIG. 5 is a circuit diagram of an amplifier in FIG. 2.

The alternating Hall-generator output voltage, designated $V_H$, and corresponding to curve VI, passes to an alternating voltage transistor amplifier 8 more fully shown in FIG. 5. The amplifier 8 includes an output transformer with two center-tapped secondary windings 9 and 10. The latter constitutes part of a demodulator wherein two pairs of outwardly poled diodes 11, 13 and 12, 14 connect the ends of winding 9 and 10 respectively to the two junction points at the ends of a voltage divider composed of resistors 15 and 16 across which is taken an output $V_z$. Connecting respective center taps of windings 9 and 10 are the ends of a center-tapped secondary winding on a demodulating and polarity-reversing transformer 17, whose secondary-winding center tap connects to the mid-tap of voltage divider 15, 16. A conventional square-wave generator 18 forming part of the demodulator applies to the primary of transformer 17 a square wave in step with each cycle of current $i_F$, i.e. curve I. This effectively reverses every other half-cycle of the amplified voltage $V_H$, i.e. curve VI. If then nothing further were applied to transformer 17 the result would be a continuous curve corresponding to curve III. However, the input pattern to transformer 17 is reversed at each time T so that the output voltage $V_z$ corresponds to the curve (c). Triggering of the generator 18 is accomplished by members 21, 26, 25 and 24 as will be explained.

The demodulated voltage $V_z$ corresponding to curve (c) of FIG. 1 passes to a counting reactor 19 serving as an integrator. A resistor 20 in series with reactor 19 exhibits a significant voltage drop only when the core of counting reactor 19 is saturated. This saturation serves to trigger a flip-flop amplifier 21 which, through switching transistor circuit 22, switches a direct-voltage counting device 23 one step.

The flip-flop 21 also switches on and off, at times T, a transistor 26 in a diode bridge 26'. The latter connects across a second diode bridge 24 by means of a series resistor 25.

The rectifier arrangement 24, active as a voltage divider is composed of 8 silicon diodes joined as shown and energized in series with the field rectifier 5 by its end points C and D. Connected to a point A on the arrangement is one trigger input of generator 18. Both points C and D connect to the other trigger input at a point B of generator 18. Point C connects to B through resistor 25. Point D connects to B through the diode bridge 26'. The voltages at A, C and D are applied by the leads 1 and 2 through the rectifier bridge 5. The zero passages of the voltage waveforms on the diodes 24 are particularly steep due to the almost parabolically curved diode characteristics. Thus the triggers at points A, C and D essentially occur during the zero passages of current in the circuit of field 7.

As stated, the flip-flop 21 periodically turns on the transistor 26 in the direct-current branch of the diode bridge 26' and serving as an electronic switch between the points B and D. Depending upon whether the transistor 26 is on or off, the rectifier bridge 26' will conduct or not conduct on the alternating current side. If transistor 26 is off, points B and D are disconnected and the voltage between points A and C on the bridge triggers the square-wave generator 18 through the resistor 25. When transistor 26 is on, points B and D are connected and the resistor 25 essentially connects across the bridge 24 between points C and D. Thus it is the voltage between points A and D which now serves as a trigger voltage for the square-wave generator. The voltage between A and D is phase-shifted 180° from the voltage between A and C, thereby producing reversal of generator 18 output voltage and hence reversal of voltage $V_z$ in FIG. 2 after each time T in curve C of FIG. 1. Obviously the time T depends upon the power measured in the alternating current load. The less the power the longer is the reversal interval.

Figure 3:
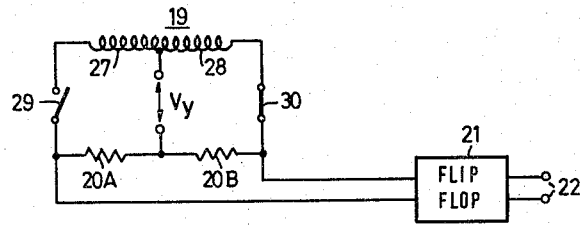
FIG. 3 is a circuit diagram of a commutator applicable to FIG. 2.

Another means for commutating the flux in the counting reactor 19 and substituting for members 19, 20 in FIG. 2 is shown by FIG. 3. This circuit dispenses with the need for switching the square-wave output of transformer 17, and hence dispenses with the need for the bridge 26'. Here the reactor 19 is comprised of two mutually opposed windings 27 and 28. The input voltage $V_y$ corresponds to curve III or to the first few sinusoidal cycles of the voltage $V_z$, i.e. diagram (c). Switches 29 and 30 alternately switch the voltage $V_y$ to be integrated across one of the two windings. The flip-flop 21 of FIG. 2 connects across the two resistors 20A and 20B.

The switching members 29 and 30 cannot be composed of transistors, because large errors would occur at low load powers and at the accompanying small values of the voltage $V_y$ near the threshold voltages of the transistors. Also at the voltage reversals of $V_y$ the transistors would apply inverse voltages on the transistor electrodes.

Figure 4:
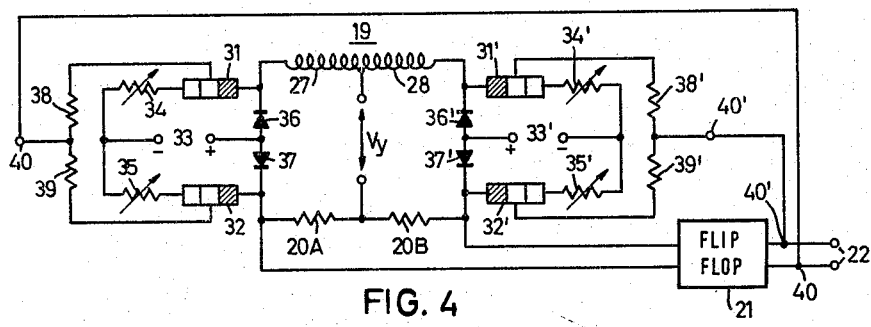
FIG. 4 is a circuit diagram of contact member in FIG. 3.

FIG. 4 illustrates the contactless construction of switching members 29, 30. These threshold-free semiconductor switches each comprise two oppositely conducting diodes 36, 37 and 36', 37' connected in series. For the purpose of switching the magnetizing current to the counting reactor, the diodes of each pair conduct opposing forward currents significantly greater than the current to be switched and producing the equal and opposite voltage drops across both diodes. For the diodes 36, 37 this is accomplished by two transistors 31 and 32, whose emitters connect respectively to diodes 36 and 37, and whose collectors connect to the negative pole of a voltage source 33 through variable resistors 34 and 35 respectively. The positive pole of source 33 connects to the junction of 36, 37. Their bases are connected through respective resistors 38 and 39 to the output terminal 40 of the flip-flop 21 of FIG. 2. Corresponding members 31' to 32', 38' and 39' similarly connect to the other pair of diodes 36', 37'. The bases 38', 39' connect to the other terminal 40' of flip-flop 21.

If the transistors 31 and 32 are rendered conductive by flip-flop 21, current flows from source 33 through diodes 36, 37, transistors 31, 32 and resistors 34, 35. The resistors 34 and 35 are adjustable to equalize the voltage drop across the diodes 36 and 37. Thus the threshold values of the diodes produce no potential difference at the terminals of the semiconductor switches. The internal impedance of the switches corresponds to the sum of the differential resistances of both diodes at the set operating point. The voltage to be switched must at the highest be only as great as the control voltage of the base-emitter circuit of transistors 31 and 32.

Resistors 38 and 39 control the transistors 31 and 32. The resistor junction connects to the terminal 40 at the output of flip-flop 21 which flips over upon the core of reactor 19 reaching saturation, or depending on the accompanying appearance of voltage across the resistors 20A and 20B.

FIG. 5, showing a preferred form of amplifier 8, illustrates a high negative-feedback alternating-voltage amplifier. Its output voltage $V_0$ derives from its input voltage $V_H$, its amplification $G$, and its negative feedback coupling factor $k$ which provides the component that is fed back from the output to the input. Thus $$V_0 = \frac{V_H}{\frac{1}{G}+k}$$

If the amplification is high then $$V_0 = \frac{V_H}{k}$$

In FIG. 5 the Hall voltage $V_H$ passes through a feedback winding 41 to a preamplifier stage composed of two transistors 42 and 43 having collector resistors 44 and 45 connecting to the negative pole of a ±24 volt source whose mid-tap is connected to zero potential. Capacitors 47 and 48 couple the preamplifier stage to the main amplifier stage. The latter comprises two transistors 49 and 50 with a common emitter resistor 51 in whose current circuit is located the four-part primary winding 52, 53, 54, 55 of the output transformer. The secondary windings are designated 9 and 10 as in FIG. 2, and also 41.

The feedback factor arises from the number of winding turns $W_R$ of the winding 41 and the winding turns $W_0$ of the secondary winding portions. Thus $$k = \frac{W_R}{W_0}$$

and $$V_0 = V_H \frac{W_R}{W_0}$$

The counter 23 is an electromechanical pulse counter for counting speeds up to 50 pulses per second. Such pulse counters are obtainable from J. Hengstler, Aldingen, Kreis Tuttlingen.

The basic concept of the invention of undertaking reactive measurement with an electronic meter having a Hall generator circuit connected for reactive power measurement, and then demodulating the output alternating voltage after amplification and before integration, may be accomplished otherwise than with the disclosed embodiments. For example the integrator may also comprise other devices instead of the counting reactor. In general it is obvious that the invention may be embodied otherwise than as shown.

I claim:

1. An electronic alternating-current power metering system, comprising a Hall generator having two input circuits for respective current and voltage input magnitudes of the alternating current to be metered and having a magnetic field coil in one of said input circuits and a field-exposed Hall plate in said other input circuit and a Hall-plate output circuit, rectifier means connected in one of said input circuits to provide one of said input magnitudes in rectified condition whereby said Hall generator operates as a modulator and said output circuit furnishes a modulated alternating voltage, an amplifier connected in said output circuit, a demodulator connected to said amplifier, integrating means connected to said demodulator, said integrating means comprising a counting reactor including two oppositely switched windings, indicating means connected to said integrator for operation in accordance with the active power value of the alternating current, said indicating means being a counter, a flip-flop amplifier connected between said integrating means and said counter, and phase-reversal circuit means responsive to saturation of said counting reactor and connected to said demodulator for reversing the output voltage of said demodulator at each saturation of said counting reactor, said counting reactor including switching means for each winding, said switching means having semiconductor circuits and said semiconductor circuits including biasing means for making them threshold-free.

2. An electronic alternating-current power metering system, comprising a Hall generator having two input circuits for respective current and voltage input magnitudes of the alternating current to be metered and having a magnetic field coil in one of said input circuits and a field-exposed Hall plate in said other input circuit and a Hall-plate output circuit, rectifier means connected in one of said input circuits to provide one of said input magnitudes in rectified condition whereby said Hall generator operates as a modulator and said output circuit furnishes a modulated alternating voltage, an amplifier connected in said output circuit, a demodulator connected to said amplifier, integrating means connected to said demodulator, said integrating means comprising a counting reactor including two oppositely switched windings, and switching means for each winding, indicating means connected to said integrating means for operation in accordance with the active power value of the alternating current, said indicating means being a counter, a flip-flop amplifier connected between said integrating means and said counter, and phase-reversal circuit means responsive to saturation of said counting reactor and connected to said demodulator for reversing the output voltage of said demodulator at each saturation of said counting reactor, the switching means of said counting reactor being connected in series with each of the windings of said counting reactor for carrying the reactor current and including for each winding two oppositely poled series-connected diodes and source means for passing a control current through each pair of opposing diodes greater than the currents being switched so as to establish therein opposite and equal polarities when no main current flows.

References Cited

UNITED STATES PATENTS 2,836,794 5/1958 Davis et al. _____ 324—117
3,156,859 11/1964 Cox _____ 330—10 X

FOREIGN PATENTS 1,010,156 6/1957 Germany.

WALTER L. CARLSON, *Primary Examiner.*

RUDOLPH V. ROLINEC, *Examiner.*

G. L. LETT, J. J. MULROONEY, *Assistant Examiners.*